United States Patent [19]

Sojka

[11] Patent Number: 4,940,974
[45] Date of Patent: Jul. 10, 1990

[54] MULTITERMINAL COMMUNICATION SYSTEM AND METHOD

[75] Inventor: Marvin L. Sojka, Cedar Rapids, Iowa
[73] Assignee: Norand Corporation, Cedar Rapids, Iowa
[21] Appl. No.: 265,842
[22] Filed: Nov. 1, 1988
[51] Int. Cl.$^5$ .............................................. H04Q 9/00
[52] U.S. Cl. ........................... 340/825.080; 370/95.2; 340/825.47; 455/34; 455/31
[58] Field of Search ...................... 340/825.08, 825.47, 340/825.06, 825.07, 825.44; 379/59, 60; 370/90, 96, 95.1, 95.2; 455/31-34, 45, 95, 89

[56] References Cited

U.S. PATENT DOCUMENTS

| | | | |
|---|---|---|---|
| 4,100,533 | 7/1978 | Napolitano et al. | 340/825.08 |
| 4,149,144 | 4/1979 | Diefenderfer | 370/96 |
| 4,466,001 | 8/1984 | Moore et al. | 340/825.08 |
| 4,569,047 | 2/1986 | Aimura | 340/825.08 |
| 4,586,040 | 4/1986 | Akiba et al. | 340/825.08 |
| 4,595,921 | 6/1986 | Wang et al. | 340/825.08 |
| 4,667,193 | 5/1987 | Cotie et al. | 340/825.08 |
| 4,682,168 | 7/1987 | Chang et al. | 340/825.08 |
| 4,780,715 | 10/1988 | Kasugai | 340/825.08 |
| 4,809,268 | 2/1989 | Tejima et al. | 370/96 |

Primary Examiner—Donald J. Yusko
Assistant Examiner—Eric Oliver Pudpud
Attorney, Agent, or Firm—Neuman, Williams, Anderson & Olson

[57] ABSTRACT

In an exemplary communications system a multiplicity of mobile terminals are to share a communications link with a primary processor. The primary processor may transmit a multiterminal polling signal defining a series of successive response time slots which the terminals may randomly select. A terminal wishing to send a message transmits a brief response burst in the selected time slot giving its identification. The primary processor may then sequentially poll specific individual terminals having messages to send. The primary processor may maintain a record of currently active terminals and/or of collisions (where more than one terminal seeks to transmit in the same response time slot), and as needed may automatically send e.g. with its multiterminal poll, a time slot number change, creating a greater or lesser number of time slots for future use by the active terminals. The system is thus highly adaptable on a dynamic basis during operation so as to readily maintain optimum throughput under changing conditions. As a consequence additional terminals may become active simply by transmitting their respective identifications in randomly selected response time slots. The multiterminal poll may include a listing of one or more terminals for which the primary processor has a message so that the primary processor may be assured that such terminal is available (as indicated by its response in a random time slot) before a lengthy message is sent.

9 Claims, 4 Drawing Sheets

SYSTEM TIMING (MSEC)

SYSTEM TIMING (MSEC)

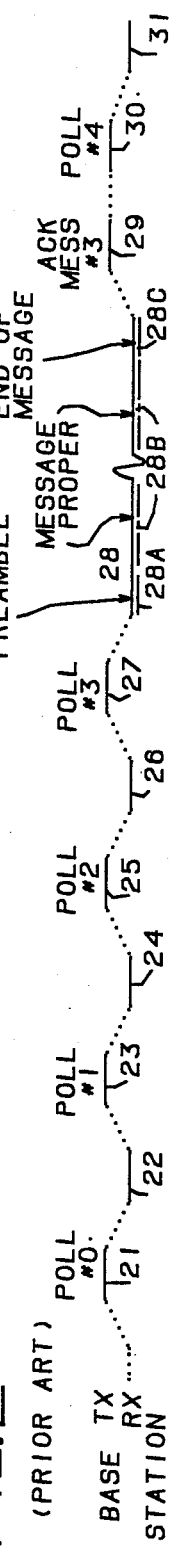
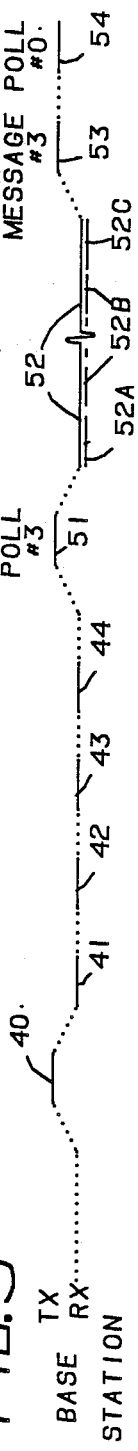

MULTITERMINAL COMMUNICATION SYSTEM AND METHOD

AUTHORIZATION PURSUANT TO THE COMMISSIONER'S NOTICE OF MAR. 20, 1987 (1077 OG 22)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a communication system suitable for the transmission of messages from a large number of secondary units to a primary unit, and in a presently preferred implementation relates to improvements in radio data communication systems wherein a number of mobile transceiver units are to transmit data to a base station under a wide range of operating conditions. The invention is preferably to be applicable as an upgrade of an existing data capture system wherein a number of hand-held transceiver units of an earlier design are already in the field representing a substantial economic investment in comparison to the cost of a base station.

In communication systems, various approaches have been taken to allocating use of a communications link among a large number of terminals. In a sequential polling technique, each of the terminals may be polled in sequence. Each terminal may be required to wait its turn when it has a message to send, and many terminals may be polled which have no messages to send. In a time slot type system, a general poll is sent, and terminals with messages to send respond in random ones of a series of time slots following the general poll. It is conceived that a more efficient and adaptable communication system would result from a fusion of these seemingly incompatible polling techniques.

SUMMARY OF THE INVENTION

An important object of the invention is to provide a multiterminal system and method having increased throughput efficiency in comparison to a system based on either the sequential polling approach or the slotted polling technique as heretofore practiced.

Another important object is to provide such a multiterminal system and method which is automatically dynamically adaptable to varying numbers of active terminals and/or other changing parameters during a given operating time period.

A more specific object of the invention resides in improving the data throughput of low-cost FM or FSK data communications equipment used on existing narrowband channels.

Further objects reside in the provision of a radio data communication system which provides a reliable and efficient communication system which is dynamically adaptable to a wide range of operating conditions.

Other objects, features and advantages of the present invention will be apparent from the following detailed description taken in connection with the accompanying drawings, and from the respective features of the appended claims taken individually and in cooperative combinations.

DESCRIPTION OF THE DRAWINGS

FIG. 2 is a diagrammatic illustration of the sequential polling procedure which is utilized with the prior art system of FIG. 1;

FIG. 5 is a diagram similar to FIG. 2 but illustrating a basic protocol in accordance with an aspect of the present invention, and which is to be utilized with a high performance type of mobile terminal unit representing the next generation in comparison to the system represented in FIG. 4;

DETAILED DESCRIPTION

Description of FIGS. 1-4

Figure 1:
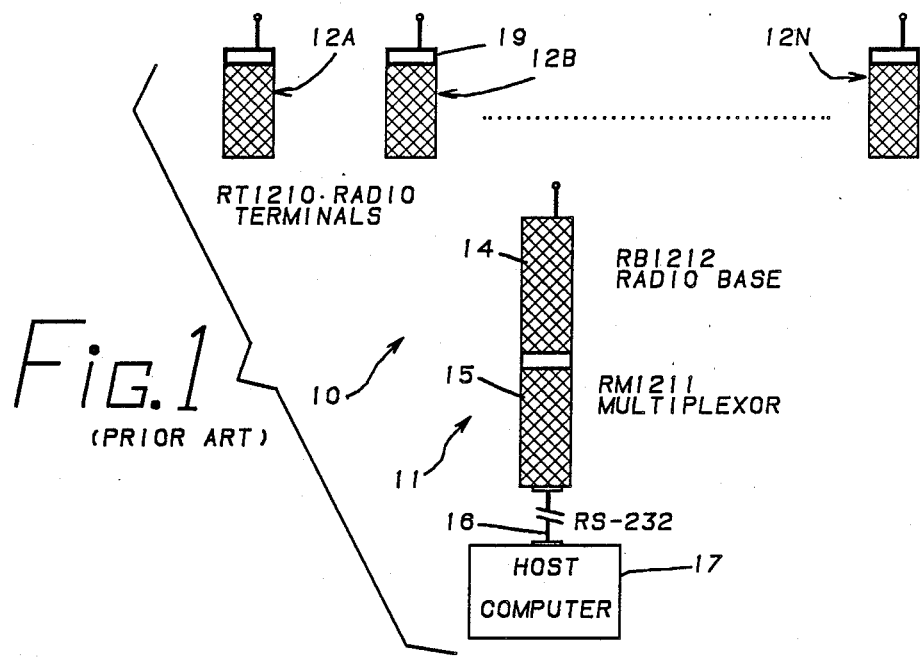
FIG. 1 is a diagrammatic illustration of an existing prior art radio data system which may be upgraded to incorporate features of the present invention.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of a radio base unit 14 such as the model RB1212 of Norand Corporation, Cedar Rapids, Iowa which forms part of a product family known as the RT1200 system. In this case, the radio base 14 may receive data from the respective mobile RF terminals, e.g. of type RT1210, and transmit the received data via a multiplexor 15, e.g. type RM1211, and a communications link 16 (e.g. utilizing an RS--232 format) to a host computer 17.

The data capture terminals 12A, 12B, . . . , 12N may each be provided with a keyboard such as 18, a display as at 19, and a bar code scanning capability, e.g. via an instant bar code reader such as shown in U.S. Pat. No. 4,766,300 issued Aug. 23, 1988 and known commercially as the 20/20 High Performance Bar Code Reader of Norand Corporation.

The RT1200 system utilizes time division multiplexing on a single frequency channel (e.g. in the 450 megahertz band) to provide access to the respective terminals. The RT1200 communications protocol is based on a sequential polling method that transmits a query addressed to each portable terminal in succession, and allows a specified amount of time for the addressed terminal to respond in case a data message is ready for transmission.

A transmitted message consists of an initialization sequence, unit address, message identifier and system information, message data and/or control commands, error control, and end of message indication.

The basic sequential polling procedure of a base station such as the RB1212 is illustrated in FIG. 2 wherein level TX represents transmit mode of the base station, and level RX represents receive mode. In FIG. 2, solid line 21 represents a transmit time interval wherein the base station transmits a polling signal for a mobile unit of a first address, e.g. #0, at a predetermined data rate e.g. 4800 baud. The base station then allows a specified amount of time represented as time interval 22 for the addressed terminal to respond if communication activity is required. The intervals at 23 and 24 apply to a second terminal address, e.g. #1, the intervals 25 and 26 apply to a third terminal address, e.g. #2, the time intervals 27 and 28 represent the operation of a fourth terminal, e.g. #3, and so on.

The sequential polling process is timed by the multiplexor 15, FIG. 1, of the RT1200 system such that if a response is not received from the addressed mobile terminal within the allotted time such as indicated at 22, a poll is issued to the next terminal in the sequence, e.g. as indicated at 23. In the RT1200 system, if the designated mobile unit has some information to send to the host computer 17, that information is immediately transmitted to the host as the response, in which case the base station remains in reception mode. In effect, for the RT1200 system, any of the reception intervals 22, 24, 26, etc. will be extended so as to receive complete messages from the respective addressed terminals where such messages are ready to be sent in response to the respective polling transmissions 21, 23, 25, 27, etc. In FIG. 2, it is assumed that mobile unit #3 is the first unit with a message to send. In this case, the base station while in receive mode as indicated at 28, will actually receive a transmission from mobile unit #3 indicating that a message will follow. The base station in response to the transmission from mobile unit #3 (which is signified by a second line 28A in FIG. 2) remains in receive mode for the duration of the message from unit #3. The message itself from unit #3 may occur over a time interval as represented by dot-dash line 28B, and may be followed by an end of message transmission from unit #3 as indicated by a second line at 28C. In response to the end of message signal at 28C, the base station switches to transmit mode and transmits an acknowledgement message as indicated at 29 for advising unit #3 that the message was properly received.

The base station then resumes polling, e.g. transmitting a polling signal at 30 addressed to a mobile unit #4 and switching to receive mode for an interval 31, and so on. In order to minimize channel capacity that is wasted polling inactive terminals, activity time-outs may be employed so that units that have not transmitted are dropped from the polling sequence and placed in a contention queue. The assumption would be that inactive units are either not being used at all or that the operator is busy at some other activity for significant amounts of time.

Figure 3:
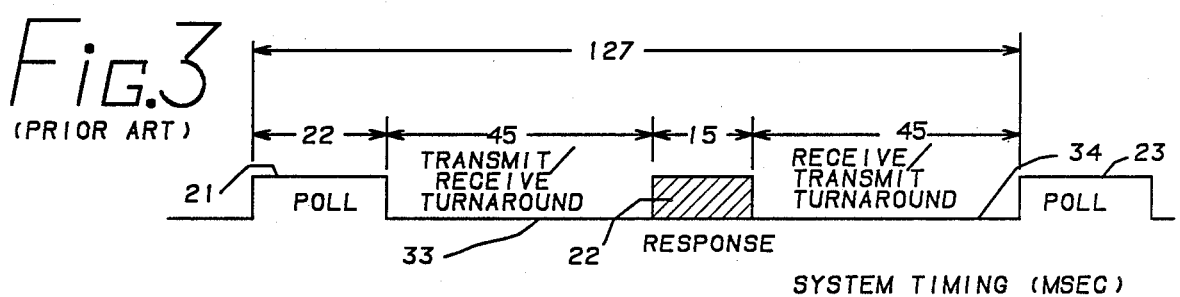
FIG. 3 is a diagram illustrating the system timing for the prior art system of FIGS. 1 and 2.

FIG. 3 illustrates standard system timing (in milliseconds) for the RT1200 system as represented in FIGS. 1 and 2. As indicated, a polling sequence such as indicated at 21 and 22 in FIG. 2 may occupy an overall time interval of 127 milliseconds, with a poll interval corresponding to interval 21 in FIG. 2 requiring twenty-two milliseconds, a transmit/receive turnaround interval such as represented at 33 in FIG. 2 requiring forty-five milliseconds, and a receive interval such as indicated at 22 in FIG. 2 being allotted fifteen milliseconds.

Figure 4:
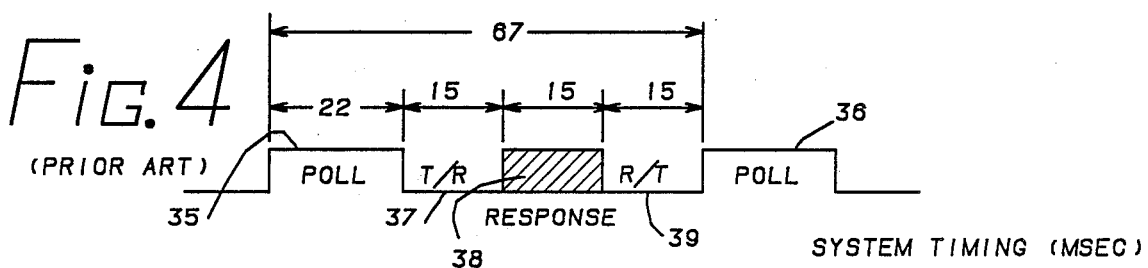
FIG. 4 is a diagram similar to FIG. 3 and illustrating system timing for a prior art system having nearly twice the polling speed of the system of FIGS. 1-3.

FIG. 4 illustrates the corresponding standard system timing (in milliseconds) for a second product family known as the RT2200 system of Norand Corporation. In this case, a standard cycle corresponding to the intervals 21, 33, 22 and 34 in FIG. 3 requires a total of sixty-seven milliseconds, polling intervals such as 35 and 36 requiring twenty-two milliseconds, and intervals 37, 38 and 39 each requiring fifteen milliseconds. The shorter transmit to receive and receive to transmit times offered by the RT2200 system result in nearly twice the polling speed in comparison to the RT1200 system. The modulation method and communication bit rates are identical in the two system families so that it is possible for the components of the RT1200 and RT2200 systems to be mixed subject to some limitations. For example, any mix of terminals or bases that includes an RT1211 multiplexor or an RT1212 base requires that the forty-five millisecond intervals such as 33 and 34 be included during communication involving these components. More particularly, if either the RT1212 base station or RT1211 multiplexor is used with a mixture of RT1210 and RT2210 terminals, all terminals must respond using the slower (45ms) delay. If these units are replaced with both the RB2212 base, and RM2216 multiplexor, the system has the capability of adjusting the delay to match the particular terminals in use. For example, if units #1, #5, and #7 are RT2210's, and units #2, #3, #4, and #6 are RT1210's, the former three will be polled using the 15ms delay, the latter four will be polled using the 45ms delay.

Description of FIG. 5

In a more recent commercial development, a type of mobile terminal unit is to be utilized that includes a high performance 16-bit microprocessor and a memory capacity that allows large and complex application programs to reside and be executed within the terminal. With the introduction of this terminal, which is identified as the RT2210 Radio Data Terminal of Norand Corporation, it is particularly convenient to load the basic terminal with programming so that the resultant programmed terminal will operate as part of an embodiment of a communication system in accordance with the present invention. Such a programmed terminal may interact with a primary communications controller according to a sequence of events such as illustrated in FIG. 5. Implementation of this embodiment of the invention may be effected by means of a new read only memory (firmware) to be loaded into the RT2210 basic terminal, for example.

As shown in FIG. 5 a multiterminal polling message such as indicated at 40 is transmitted to all terminals in the system, and the terminals are allowed to respond in random "time slots" such as indicated at 41-44 to indicate to the controller that communication activity is desired by the terminal. The example in FIG. 5 provides four time slots 41-44 in which the terminals may respond to the poll. In practice, the number of time slots are varied depending on the traffic load and other conditions. Each terminal may respond to the poll 40 in any of the desired time slots with its address and some positive acknowledgement. The particular time slot in which the terminal chooses to communicate is selected at random by the terminal. In the event that several terminals—potentially more than the number of time slots available, desire communications, a good probability may remain that at least one of the terminals will transmit its response in a time slot which is free of other responses. Under light loading conditions, it is likely that more than one slot will contain an intelligible response message, which further improves the efficiency of the polling procedure. An additional efficiency improvement may be realized because of a "capture" phenomenon of radio frequency modulation that allows recovery of a relatively strong signal in the presence of a relatively weak interfering signal.

Referring to FIG. 5, it may be that a terminal unit with an address of #3 responded during the first time slot 41, and that a terminal unit #0 responded in time slot 43. Several terminal units may have simultaneously responded in time slot 42 such that none was identified by the base station. In such a case, the base station after elapse of time intervals 41-44, may first transmit a polling signal 51 addressed to terminal unit #3, and then receive a message from unit #3 as indicated at 52. As in FIG. 2, the message received at 52 may include a preamble indicated at 52A, a message proper 52B, and an end of message signal 52C. The base station may then transmit an acknowledgement message as represented at 53, and thereafter proceed during time interval 54 to poll the next terminal unit, e.g #0, which successfully responded to the general poll at 40. The message from terminal unit #0 may include message components such as described for message 52. After each successfully responding mobile terminal has been polled and its respective message received, the procedure may be repeated with a further multiterminal polling cycle as at 40-44. The technique illustrated in FIG. 5 is herein termed slotted reservation-access polling since secondary terminal units with a message to communicate issue responses in randomly selected slots which merely seek entry to a queue of secondary units desiring to transmit, (that is, the responding secondary units seek to reserve a future time allocation from the primary unit, at which future time each successful secondary unit will be granted access to the primary unit in accordance with its reservation).

Figure 6:
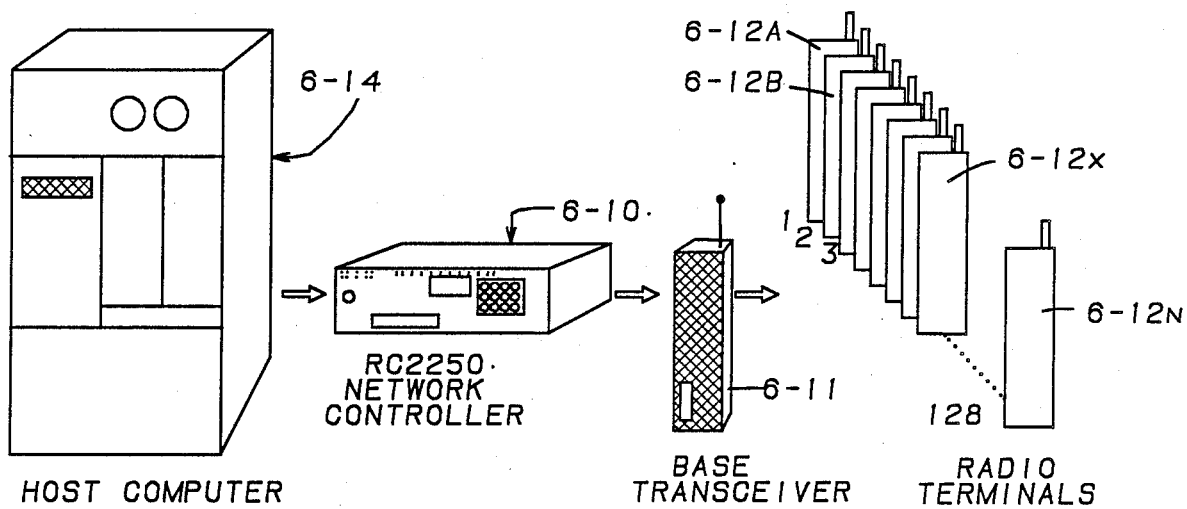
FIG. 6 is a diagrammatic illustration of an embodiment of multiterminal communication system in accordance with the present invention, applied to the field of mobile radio data communication.

Description of FIG. 6

FIG. 6 shows an exemplary multiterminal communications system in accordance with the present invention. In this embodiment a type RC2250 network controller of Norand Corporation is programmed according to a protocol embodiment known as the RTC protocol so as to provide a programmed network controller means 6-10. In this particular embodiment which is in successful operation, a base transceiver 6-11 is in a separate housing from the controller means 6-10 and utilizes an existing product of Norand Corporation known as the Model RB2212 base station transceiver.

In the specific example of FIG. 6, the network controller means 6-10 manages all communication and processing of data between a group of radio terminals such as indicated at 6-12A, 6-12B, . . . ,6-12X, . . . 6-12N, and a host computer 6-14. Each radio terminal may be a separate hand-held or vehicle-mounted unit comprised of a model RT2210 commercial product of Norand Corporation with firmware programming so as to coact with the controller system 6-10 according to a protocol embodiment known as the RTC protocol.

Figure 7:
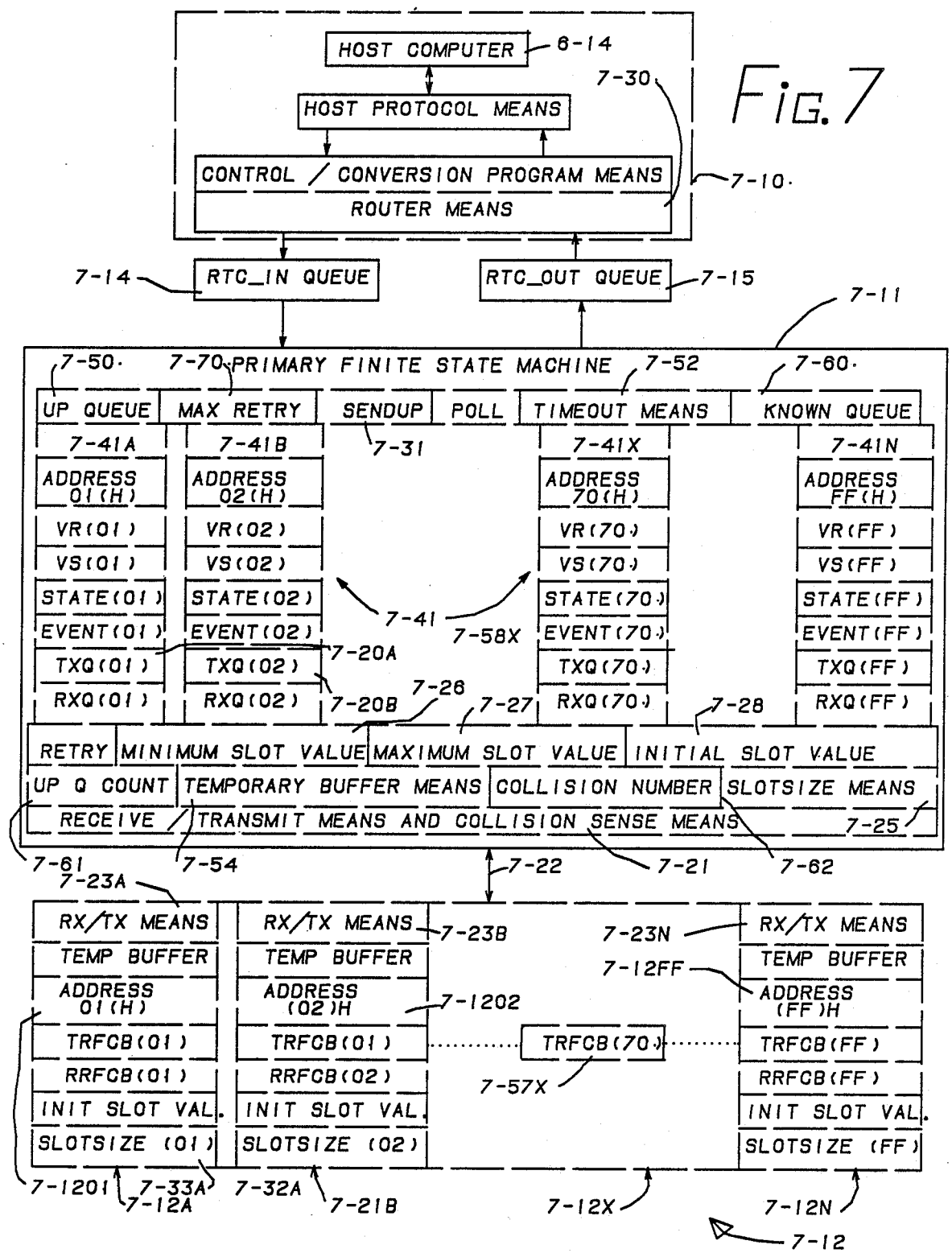
FIG. 7 is a diagram useful in explaining the logic structure and information flow in a communications system such as represented by the embodiment of FIG. 6.

Description of FIG. 7

In APPENDIX A to the present specification, a detailed document covering the RTC protocol embodiment is reproduced. This document presents the information required to readily implement the embodiment of FIG. 6.

For the sake of an introduction to descriptive terminology, the following discussion in relation to FIG. 7 is presented. While the present discussion includes aspects dependent on the particular example of FIG. 6, the application of the teachings herein e.g. to a local area network without radio links, will be apparent to those skilled in the art from the present disclosure.

Referring to Section 2.0 COMMAND LINE of APPENDIX A, an exemplary command for the system of FIG. 6 might appear as follows: run rtc -d90(H)-iF0(H)-q3 where the symbol (H) simply indicates that the preceding two characters are in hexadecimal notation for purposes of the present description. Referring to APPENDIX A, the command line indicates that the address of the data port is 90(H), the interrupt number to use is F0(H), and the queue number to use for the queue indicated at 7-15 is three. It will be noted that for the present implementation the data packet size may have a value of 128 bytes while the number of secondary terminal units such as 7-12A, 7-12B, . . . , 7-12X . . . , 7-12N may be any number up to 128. Where the symbol (H) is omitted, ordinary decimal notation is intended in the present text.

Referring to Section 3.0 RTC PROGRAM INTERFACE of APPENDIX A, the system of FIG. 7 uses two queues 7-14, 7-15 for communication with a higher layer, termed host means 7-10. The queue 7-14 is used to pass messages into the RTC task means 7-11 from host means 7-10, and queue 7-15 is used to pass messages to the host means 7-10.

The messages are passed in control structures called buffers as defined in Section 3.0. (All Section numbers herein refer to APPENDIX A.) For queues 7-14 and 7-15 a chain of buffers according to the present example are to be on successive entries in the queue.

Section 3.1 enumerates the types of messages which may be supplied to task means 7-11 via queue 7-14. Such messages may of course originate at a host computer such as indicated at 6-14, FIGS. 6 and 7. Referring to Section 3.1.1, data for a given terminal unit such as 7-12B may be supplied by task means 7-11 to a corresponding terminal queue such as the queue indicated at 7-20B, and will thereafter be transmitted in its turn e.g. on a first-in, first-out basis.

In Section 3.1.3, the version inquiry may be used to identify the particular version number of programming in a selected terminal where different terminals may have different versions of the basic RTC programming.

In Section 3.1.7, the RTC MUX may be implemented by programming of the processor of network controller means 6-10. Such processor may be a type 80186 microprocessor in this particular embodiment. In this way a separate multiplexer unit (such as the RM 1211 multiplexer of FIG. 1) is not required. The function of a multiplexer is represented at 7-21 in FIG. 7.

As indicated in Section 3.1.8, the slot configuration as represented at 41-44 in FIG. 5 may be changed during system operation, e.g. by changing the specification as to the numbers of slots which may be randomly selected by the secondary terminal units. The number of slots of a given duration may be specified as part of each multiterminal message such as 40, FIG. 5, but an initial slot or an initial set of slots may be made unavailable by selecting as the initial slot value a slot position such as 42 (initial slot value equals e.g. two) or such as 43 (initial slot value equals three). The effect is to introduce added delay between the multiterminal poll e.g. at 40 and the first time slot which may be selected by a responding terminal or responding terminals. The system may automatically and dynamically select the number of available slots e.g. as registered at slot size means 7-25, beginning with the initial slot value e.g. as registered at initial slot value means 7-28. Such number of available slots may be automatically adjusted, e.g. for each multiterminal poll, within the limits specified by the minimum and maximum slot values registered at 7-26 and 7-27.

Referring to Section 3.2 of APPENDIX A, the RTC task means 7-11, places messages as enumerated in the Section in queue 7-15 for supply via host means 7-10 e.g. to host computer 6-14. The host means 7-10 may be viewed as including a router means indicated at 7-30 for determining the disposition to be made of messages received from the queue 7-15. For example, referring to Section 3.2 1, the host means 7-10 may decide if terminal data received from queue 7-15 should be sent to the host or not.

Section 4.0 of APPENDIX A uses the terminology RTC Primary State Machine and Section 5.0 refers to a RTC Secondary State Machine. These sections discuss the programming and data structures employed in primary task means or primary processor means 7-11, and in secondary task means or secondary processor means 7-12A, 7-12B, ... ,7-12X, ... , 7-12N (and collectively designated 7-12), respectively.

The primary finite state machine of primary processor means 7-11 includes an UP send routine which is represented at 7-31 (SEND UP), and individual unit finite state machines collectively designated by reference numeral 7-41, and individually indicated at 41A, 41B, ... , 41X, ... , 41N. The routine represented as SEND UP means 7-31 is designated in the programming of the primary finite state machine with the notation rtc$_{13}$send_up and functions to send an UP command via link means 7-22 to the respective secondary finite state machines or secondary units 7-12A, 7-12B, . . ., 7-12X, ... , 7-12N. In response thereto, the secondary units may randomly select time slots according to respective slot parameters from slot parameter tables as indicated e.g. at 7-32A and 7-33A for secondary unit 7-12A.

For example, if the initial slot value is three, and slot size is twenty, a maximum of twenty units may succeed in sending response bursts in time slots such as 43,44, FIG. 5, which are correctly received by the primary processor means 7-11. A list of the addresses or identification means (such as 7-1201, 7-1202, ... , 7-12FF) of the secondary units which transmit valid responses are then entered in an UP QUEUE means 7-50 (designated UP_queue in Section 4.0). The primary processor means under the control of the send_UP routine given by way of example in Section 4.0 may first send its slot size parameter at 7-25 to all secondary units, e.g. as part of a poll message. The secondary units then may select response time slots according to this transmitted slot size as stored at 7-33A, etc., and initial slot values as already stored at 7-32A, etc. The primary processor means 7-11 may count the number of secondary units represented in the UP QUEUE means 7-50 (termed up_q_count in Section 4.0), and if this number is greater than zero, a new slot size value may be entered into slot size means 7-25, equal to the value stored at minimum slot value means 7-27, e.g. ten.

For the illustrated embodiment, the link 7-22 can be simultaneously accessed by more than one secondary unit, the result being a garbled message burst at the receiver of 7-21. Such garbled messages will be recognized as invalid (using any suitable validity check such as the CRC-16 check value of Section 6.1), and will be counted as a collision by collision sense means of 7-21. As represented in Section 4.0, the send_UP routine may respond to the presence of collisions in a selected number of available time slots to increase the slot value at slot size means 7-25 by an increment (slot_inc, Section 4.0) which may be selected at start up of the system. As indicated in Section 4.0, if the new value of slot size is greater than the maximum value at 7-27 (max_slot_size, Section 4.0) then the contents of known queue means 7-51 is transferred to UP queue means 7-50.

Referring to Section 6.2.1, the primary processor means 7-11 may send a multiterminal polling message such as the following to all secondary terminal units: <FF(H)><FF(H)><8A(H)>. This is termed in Section 6.2.1 an UNNUMBERED POLL, and may also be referred to as a multiterminal poll to distinguish it from a poll directed to a specific secondary terminal (as at 51, FIG. 5). The first segment of the multiterminal polling message is the broadcast address (Section 6.2.1) or multiterminal address. The second segment is the RTC command byte (Section 6.2.1) which may represent the UP command (see Section 6.2). The third segment of the multiterminal polling message may represent the number of response time slots available for the response, e.g. ten such slots of forty milliseconds each.

The multiterminal polling message may include a fourth segment giving the addresses of terminals for which messages are pending e.g. at TXQ means such as 7-20B of primary processor means 7-11.

If a secondary terminal which receives the multiterminal message notes its address in the fourth segment, or itself has a message to send, such secondary terminal will randomly select which of the specified time slots to answer in. The secondary terminal will respond with the basic RTC frame (Section 6.1) inserting its address, e.g. 02(H) for terminal 7-12B, in the address field, and the UP command FF(H) in the command field. Such a response burst is of duration less than that of a time slot.

The timeout means 7-52 may control various timeout functions such as the waiting time of the primary processing means 7-11 after transmission of a multiterminal polling message in the absence of response bursts from the secondary terminals or before sending poll messages directed to specific terminals. The TIMEOUT interval may be based on the values in initial slot value means 7-28 and the slot size value in means 7-25 (which will reflect any new slot size specified in the multiterminal polling message). For example, where the initial value is three and the slot size is ten, timeout means 7-52 may effect a corresponding timing cycle (e.g. 520 milliseconds) before sending further messages.

Where a terminal such as 7-12B has successfully responded to a multiterminal poll, the primary processing means (before the timeout means 7-52 has provided a timeout interrupt), may be advised that the temporary buffer means 7-54 has received a valid response, termed "receive" in the polling procedure of Section 4.0. Thereupon the primary processor means may establish the event "process buffer" (event=process buffer, Section 4.0) whereupon the UP queue means 7-50 will be advised that terminal 7-12B is active, and the individual unit means 7-41B will be updated to show that terminal 7-12B is ready to be polled for its message.

If another secondary terminal 7-12X (e.g. with address 112, or 70 Hexadecimal) has a message at its TRFCB means 7-57X, and enters its address at another time slot in response to the multiterminal polling message, then the primary processor means will process this response also and revise the corresponding individual unit means 7-41X for this address.

When the timeout means 7-52 shows the expiration of the unnumbered or multiterminal polling cycle time, the primary processing means may utilize the POLLx frame (Section 6.2.2) to poll specific secondary units such as 7-12X for data. Where there is data as at 7-20B to send, the primary processor means may proceed to send the data using the DATA FRAME of Section 6.2.3.

Where data is to be received from a terminal such as 7-12X, the terminal responds to the POLLx command (with the NO DATA bit not set, Section 6.2.3) by sending a data frame based on data stored at 7-57X. The primary processor means acknowledges receipt with a suitable POLLx frame (Section 6.2.2, item 2), and will store the data at RXQ means 7-58X of individual unit means 7-41X.

SUMMARY OF EXEMPLARY FEATURES

In accordance with an aspect of the present invention, the primary processor means may have a list of known secondary units (e.g. at 7-60) and a list of currently active secondary units (e.g. at 7-50). A count of currently active secondary units (e.g. at 7-61) may be maintained and each multiterminal poll may specify a number of slots (e.g. from 7-25) which is dynamically adjusted in accordance with such count (up-q-count, section 4.0) and in accordance with number of collisions (e.g. at 7-62) experienced in a sample number of recent polling cycles.

Since the system has provision for an initial slot value (e.g. at 7-28), and since the secondary terminals can register a corresponding initial slot value (e.g. at 7-32A, etc.), the primary processor means in its multiterminal polling message can assign a specific slot in which a given terminal can respond. Such specific slot could be the initial slot value minus one if there were sufficient priority messages to warrant a reserved slot during an operating time of relatively long duration. Where there are less than FF(H) actual terminals, a high order bit in the address segment (Section 6.1.1) could signal a secondary unit with address given in lower order bits to respond in the reserved time slot (e.g. initial slot value minus one or slot 41, FIG. 5, where the initial slot value was two).

SUMMARY OF OPERATION

In general, the configuration of a system such as indicated in FIG. 7 with suitable start up parameters, and the synchronization of the secondary units 7-12 with the primary processor means 7-11 may take place analogously as in a prior art system such as shown in FIGS. 1,2,3 and 4.

The detailed structure of the new types of messages is given in APPENDIX A hereto; see for example, Section 6.2.1 of APPENDIX A concerning the multiterminal polling message or UNNUMBERED POLL, which corresponds with the poll at 40 in FIG. 5.

In accordance with the teachings of the present invention, a multiterminal poll such as represented at 40 in FIG. 5 may include a slot size parameter (slot size, Section 4.0 of APPENDIX A) which specifies the number of time slots such as 41 to 44, FIG. 5, which may be utilized by responding terminals. This slot size may be dynamically varied during normal operation of the system according to a current number of active terminals, e.g. which are answering individually addressed polls within a specified number of retries (Max Retry means 7-70). See the procedure for processing each secondary unit 7-12 which is listed in UP QUEUE means 7-50, as found in Section 4.0 of APPENDIX A hereto. The dynamic variation of slot size is apparent from the send_UP routine given in Section 4.0 of APPENDIX A.

Another feature apparent from Section 6.2.1 of APPENDIX A is the ability to include optional addresses in the multiterminal polling message. This is particularly valuable for a system having appreciable transmit/receive turnaround time e.g. as represented in FIGS. 3 and 4. The contemporaneous transmission of the multiterminal polling message and message segments concerning slot parameters and/or specific terminal addresses is a particularly important aspect of the preferred system and method when utilizing a half-duplex link means 7-22 based e.g. on single channel RF transmission or the like.

It will be apparent that many modifications and variations may be effected without departing from the scope of the teachings and concepts of the present invention.

APPENDIX A referred to in the present specification occupies the following twenty-one pages and contains Sections 1.0 through 6.2.6.

```
/************************************************************************
;**                    COPYRIGHT (c) 1987,1988                         **
;**                                                                    **
;**                    NORAND CORPORATION                              **
;**                                                                    **
;**                    ALL RIGHTS RESERVED                             **
;**                                                                    **
;**     This document contains confidential information and is proprietary **
;**     to Norand Corporation.  It is being supplied to you with the express **
;**     understanding that the information contained therein be held in con- **
;**     fidence by you.  This document is not to be copied, distributed, or **
;**     displayed to third parties without the express written consent of **
;**     Norand Corporation, and shall be returned to Norand upon written **
;**     request.                                                       **
;**                                                                    **
;************************************************************************/
```

APPENDIX A 1.0 SCOPE

This document will cover the RTC protocol, tasks, and interfaces for use on the RC2250 and future use on the LAN Controller.

2.0 COMMAND LINE

To execute the RTC protocol from the command line the following format is used:

run rtc <options> where options are:

- -dn  -- indicates the address of the data port
          default is 86H
- -cn  -- indicates the address of the command
          port default is 84H
- -in  -- indicates the interrupt number to use
          default is E0H
- -pn  -- indicates the port of the controller to
          use.
          a 1 indicates Port A of the SCC
          a 0 indicates Port B of the SCC
          default is Port A
- -k   -- enable customer extensions
          default is disabled
- -s   -- enable SNA extensions
          default is disabled
- -qn  -- indicates the queue number to use for
          RTC_OUT_Q. RTC_IN_Q is RTC_OUT_Q+1
          default is RTC_OUT_Q is 22 and RTC_IN_Q
          is 23.
- -xn  -- indicates data packet size
          default is 128.
- -nn  -- number of terminals to support
          default is 128

This can be also enable by using the memrun call from inside a task.

3.0 RTC program interface

RTC uses two queues for communication to with a higher layer. These queues are named RTC_OUT_Q (default is 22) and RTC_IN_Q (default is 23). The RTC_IN_Q is used to pass message into the RTC task from a higher task and RTC_OUT_Q is used to pass messages to the higher task. If the queue numbers are different than the default values the values can be changed from the command line.

The messages are passed in control structures called buffers. These buffers are allocated at system startup and place on a global queue so all tasks can used. The files buffer.h and buffer.c must be common to all the programs so a uniform use of the buffers can be impose. The struct of a buffer is as follows:

```
typedef struct BUFFER
{
    struct BUFFER far *next;
    unsigned char chain_status;
    unsigned char type;
    unsigned length;
```

```
        unsigned char address;
        unsigned char data[132];
    } buffer;
``` where:
    next                defines a field to allow queuing of buffers.
    chain_status    defines if a larger buffer is being
                             segmented.
                             FIC (0x10) means these is the first buffer in
                                     the chain
                             MIC (0x00) means this is a middle buffer in
                                     the chain
                             LIC (0x20) means this buffer is the last
                                   buffer in the chain
                             OIC (0x30) means this buffer is the only
                                   buffer in the chain On the RTC_IN_Q and RTC_OUT_Q, a chain of
                             buffers must be on successive entries in the
                             queue or the program will act totally out of
                             spec.

type                defines a action code to be implemented. see
                             following for action codes.

length              length of data in the data portion of the
                             buffer. RTC supports a data field up to 128
                             bytes long. Data is place here that needs to
                             be used in processing.

3.1 RTC_IN_Q Messages

The RTC task uses the buffer format above to accept messages on
the RTC_IN_Q to indicate actions.

3.1.1 RF_DATA (type = 0)

This indicates there is data for the terminal with the address in
the address field. The chain_status field indicates whether this
is a FIC,MIC,LIC or OIC. The RTC task will take this data and
queue it to the terminal for transmission. All buffers from FIC
to LIC (or only OIC) must be chain together by the next field of
the BUFFER with the last buffer of chain must be a NULL pointer.

3.1.2 RF_TEST (type = 1)

This indicates that the terminal with the address in the address
field should be sent a loopback test and when completed this must
be sent to the host. The chain_status must be OIC.

3.1.3 RF_VERSION (type = 2)

A version inquiry should be sent to the terminal with the address
in the address field. The resulting respond must be sent to the
host. The chain_status must be OIC.

3.1.4 RF_ENABLE (type = 3)

This enable a terminal with the address in the address field.
The chain_status must be OIC.

3.1.5 RF_DISABLE (type = 4)

This disable a terminal with the address in the address field.
The chain_status must be OIC.

3.1.6 RF_REBOOT (type = 5)

This resets a terminal with the address in the address field.
The chain_status must be OIC. If a terminal was previously
disabled then the terminal will now be enabled.

3.1.7 RF_RESET (type = 6)

This informs the RTC MUX to reset it self to a beginning state.
Once this is completed a RF_RESETED command is sent out the
RTC_OUT_Q to inform the higher layers that it has been reset.
The chain_status must be OIC.

3.1.8 RF_CONFIG (type = 11)

This is used to send a configuration message to the RTC MUX.
Format of RF_CONFIG message is as follows:

```
typedef struct
{
   unsigned char min_slots;   /* minimum slot value for RTC */
   unsigned char max_slots;   /* Maximum slot value for RTC */
   unsigned char slots;       /* initial slot value */
   unsigned char fcc_callsign[10];    /* fcc callsign */
} configure,*configure_ptr;
```

The chain_status must be OIC.

3.1.9 RF_MSTAT (type = 12)

This inquires the RTC MUX about the status of messages for the
terminal with the address in the address field. (see section
3.2.6 for format of response)

3.1.10 RF_HALT (type = 13)

This tells the RTC MUX to suspend operations until a RF_GO buffer
is received. This can be used to disable the RTC MUX if a host
outage occurred.

3.1.11 RF_GO (type = 14)

This informs the RTC MUX that was suspended by a RF_HALT command
to resume operations.

3.2 RTC_OUT_Q Messages

The RTC task uses the buffer format above to accept messages on
the RTC_OUT_Q to indicate events that has occurred.

3.2.1 RF_DATA (type = 0)

This indicates there is data form the terminal with the address
in the address field. The chain_status field indicates whether
this is a FIC,MIC,LIC or OIC. The higher layers must decide if
it wants to sent the data to the host or not. If the amount data received is greater that 1 buffer size then the each buffer is chained to the first buffer from FIC to LIC with the last buffer in the chain next field is a NULL pointer.

3.2.2 RF_TEST (type = 1)

This indicates that the terminal with the address in the address field has responded to test indication and this is the result. The chain_status must be OIC.

3.2.3 RF_VERSION (type = 2)

A version reply was received from the terminal with the address in the address field. The resulting respond must be sent to the host. The chain_status must be OIC.

3.2.4 RF_REBOOT (type = 5)

This informs the router that the terminal with the address in the address field has been just powered up or perform a protocol reset. The chain_status must be OIC.

3.2.5 RF_RESETED (type = 7)

This informs the router that the RTC MUX has completed resetting itself. The chain_status must be OIC.

3.2.6 RF_MSTAT (type = 12)

This informs the router the status of messages for the terminal with the address in the address field. The chain_status must be OIC. The length field must be equal to 1. The first byte of data must be one of the following:

```
1 -- Terminal is disabled
2 -- Terminal has no pending message
3 -- Terminal has a pending message
4 -- Terminal has a message pending which exceeds
     inactivity timeout.
```

4.0 RTC Primary Station Routines

The major routines for an RTC primary station are a main control loop, a send UP routine, and a individual unit finite state machine. These are:

rtc_main        This routine will be a infintite loop for
                    processing.
    rtc_send_up     This will send a UP command on the link and
                    return UP_queue with all valid responses rtc_prifsm      This fsm will handle the finite state machine
                    for the primary side of a connection with a
                    secondary unit. The return value will
                    indicate whether a i-frame was received, the
                    unit is done or a reset has occurred.

The following data structures are needed by the a primary station.

UP_queue    list of all secondary responding to UP.

```
known_queue   list of all known secondaries.
secondary     array of data structures (defined below) that
              maintain all information needed to manage each
              secondary.
max_retry     the retry number for timeouts before the
              main loop goes on to the next unit.
```

The secondary data structure must include:

```
address   the secondary's address
VR        next expected ACK
VS        next ACK to send
state     the state for the prifsm.
event     inputs for the prifsm major categories
txq       queue of data to send to the secondary
rxq       queue of data from the secondary
```

4.1 RTC_MAIN

The procedure to perform main control of the RTC primary control software is as follows:

```
init
    known_list=empty do forever

UP_queue = empty
    check for terminals going inactive
    check for input messages to the RTC
    rtc_send_up
    for each secondary in UP_queue
            if secondary is not in known_list
                    add secondary to known_list
            endif
            retry = 0
            event is set to idle event
            while (execute primary fsm is not done)
                    wait receive
                    if (event != TIMEOUT)
                        event = process buffer
                    if (event == TIMEOUT)
                        if (retry < max_retry)
                            increment retry
                            event is set to idle event
                        endif
                    endif
            end
    end
end
```

The primary will poll a secondary until all data has been received from the secondary.

4.2 RTC_SEND_UP

The rtc_send_up routine will be as follows:

```
loop
        send UP(slotsize,secondarys that are in RESET state or has
                        data on their txq)
        receive UP(slotsize)
```

```
      if up_q_count > 0
        slotsize = min_slot_size
        exit
      elseif collisions
        slotsize = slotsize + slot_inc
        if slotsize > max_slot_size
            enqueue all known_list to up_queue
            exit
        endif
      else
        slotsize = min_slot_size
        up_q_count = 0.
        exit
      endif
endloop
```

4.3 RTC PRIMARY STATE MACHINE

The following is a state table for the RTC Primary state Machine.
The states are across the top and events are down the side. The
states are RESET. NORM, RSP (NORM mode with an outstanding
unacknowledged DATA frame), VERSION, and TEST.

Each state entry consists of four lines. Line one indicates the
frame to be sent. Line two indicates the state transition. Line
three indicates the action to take. The action is a letter from
the table following the state table. Line four indicates if
the state machine returns done if no further output is perform
and not done (!done) if output occurred and the rtc_main needs to
wait for input.

Each input entry consist of three lines. Line 1 indicates the
frame level input. Line 2 indicates the state of trfcb and line 3
indicates rrfcb state.

The TRFCB can be in one of three states. NULL is when the trfcb
has nothing in it or the TRFCB has sent all its data and is
awaiting a acknowledgment of the last frame. Data indicates that
there is data yet to be transfer.

The RRFCB can be in one of three states. NULL is when the rrfcb
has nothing in it. Data indicates that there is room available
for data to be transfer into and FULL indicates no more room
available for data to be transfers into.

PRIMARY STATE TABLE

| Inputs | RESET | NORM | RSP | TEST | VERSION |
|---|---|---|---|---|---|
| IDLE | RESET | POLL | POLL(N) | | |
| No Data | RESET | NORM | RSP | RESET | RESET |
| IDLE0_EVENT | !done | !done | !done | done | done |
| IDLE | RESET | DATA | POLL(N) | | |
| Data | RESET | RSP | RSP | RESET | RESET |
|  |  | c |  |  |  |
| IDLE1_EVENT | !done | !done | !done | done | done |

PRIMARY STATE TABLE (continue)

| | RESET | NORM | RSP | TEST | VERSION |
|---|---|---|---|---|---|
| IDLE<br>Data<br><br>IDLE2_EVENT | RESET<br><br><br>!done | DATA<br>RSP<br>c<br>!done | FOLL(N)<br>RSP<br><br>!done | RESET<br><br><br>done | RESET<br><br><br>done |
| IDLE<br>TEST<br><br>IDLE3_EVENT | RESET<br>RESET<br><br>!done | TEST<br>TEST<br><br>!done | RESET<br><br><br>done | RESET<br><br><br>done | RESET<br><br><br>done |
| IDLE<br>VERSION<br><br>IDLE4_EVENT | RESET<br>RESET<br><br>!done | VERSION<br>VERSION<br><br>!done | RESET<br><br><br>done | RESET<br><br><br>done | RESET<br><br><br>done |
| timeout<br><br>TIMEOUT_EVENT | RESET<br><br>done | NORM<br><br>done | RSP<br><br>done | NORM<br><br>done | NORM<br><br>done |
| RESET<br><br>RESET_EVENT | NORM<br>a<br>!done | RESET<br><br>done | RESET<br><br>done | RESET<br><br>done | RESET<br><br>done |
| TEST<br><br>TEST_EVENT | RESET<br>b<br>done | RESET<br>b<br>done | RESET<br>b<br>done | NORM<br>i<br>done | RESET<br>b<br>done |
| VERSION<br><br>VERSION_EVENT | RESET<br>b<br>done | RESET<br>b<br>done | RESET<br>b<br>done | RESET<br>b<br>done | NORM<br>j<br>done |

| Inputs | RESET | NORM | RSP | TEST | VERSION |
|---|---|---|---|---|---|
| ACK = VS<br>NULL<br><br>ACK0_EVENT | RESET<br><br><br>done | NORM<br><br><br>done | NORM<br>e<br><br>done | RESET<br><br><br>done | RESET<br><br><br>done |
| ACK = VS<br>DATA<br><br>ACK1_EVENT | RESET<br><br><br>done | NORM<br><br><br>done | DATA<br>RSP<br>f<br>done | RESET<br><br><br>done | RESET<br><br><br>done |
| ACK != ACK_RCV<br><br>ACK2_EVENT | RESET<br><br>done | RESET<br><br>done | LASTDATA<br>RSP<br>!done | RESET<br><br>done | RESET<br><br>done |
| ACK = VS<br>NULL<br><br>ACKN0_EVENT | RESET<br><br><br>done | NORM<br><br><br>done | NORM<br>e<br><br>done | RESET<br><br><br>done | RESET<br><br><br>done |

PRIMARY STATE TABLE (continue)

| ACK = VS<br>DATA<br><br>ACKN1_EVENT | RESET<br><br>done | NORM<br><br>done | RSP<br>g<br>done | RESET<br><br>done | RESET<br><br>done |
|---|---|---|---|---|---|
| ACK != ACK_RCV<br><br>ACKN2_EVENT | RESET<br><br>done | RESET<br><br>done | RSP<br>h<br>done | RESET<br><br>done | RESET<br><br>done |
| DATA<br><br>NULL<br>DATA0_EVENT | RESET<br><br>done | NORM<br><br>done | RESET<br><br>done | RESET<br><br>done | RESET<br><br>done |
| DATA<br><br>DATA<br>DATA1_EVENT | RESET<br>b<br>done | POLL<br>NORM<br>d<br>!done | RESET<br>b<br>done | RESET<br>b<br>done | RESET<br>b<br>done |
| DATA<br><br>FULL<br>DATA2_EVENT | RESET<br><br>done | RESET<br><br>done | RESET<br><br>done | RESET<br><br>done | RESET<br><br>done |
| TERROR<br><br>TERROR_EVENT | RESET<br><br>done | RESET<br><br>done | RESET<br><br>done | RESET<br><br>done | RESET<br><br>done |

```
where    a -- reset vr=vs=0
              release txq and rxq data
              send reset indication
         b -- release buff_temp from rtc_rx routines
         c -- vs = vs+1
         d -- accept data
              if data is LIC
                  send data indication
              vr = vr+1
         e -- release previous data buffer
              indicate data was send
         f -- release previous data buffer
              vs = vs+1
         g -- release previous data buffer
         h -- vs = vs-1
         i -- send test indication
         j -- send version indication
```

5.0 RTC Secondary State Machine

The following is a state table for the RTC Secondary state
Machine. The states are across the top and events are down the
side.  The states are RESET, NORM, and RSP (NORM mode with an
outstanding unacknowledged DATA frame).

Each state entry consists of four lines.  Line one indicates the
frame to be sent. Line two indicates the state transition. Line three indicates the action to take. The action is a letter from the table following the state table.

Each input entry consist of three lines. Line 1 indicates the frame level input. Line 2 indicates the state of trfcb and line 3 indicates rrfcb.

The TRFCB can be in one of three states. NULL is when the trfcb has nothing in it or the TRFCB has sent all its data and is awaiting a acknowledgment of the last frame. Data indicates that there is data yet to be transfer.

The RRFCB can be in one of three states. NULL is when the rrfcb has nothing in it. Data indicates that there is room available for data to be transfer into and No Data indicates no more room available for data to be transfers into.

SECONDARY STATE TABLE

| Inputs | RESET | NORM | RSP |
|---|---|---|---|
| RESET<br><br><br>RESET_EVENT | RESET<br>NORM<br>a | RESET<br>NORM<br>a | RESET<br>NORM<br>a |
| POLL=VS<br>NULL<br>NULL<br>POLL0_EVENT | RESET<br>RESET | POLL(N,VR)<br>NORM | POLL(N,VR)<br>NORM<br>b |
| POLL=VS<br>NULL<br>Data or No Data<br>POLL1_EVENT | RESET<br>RESET | POLL(VR)<br>NORM | POLL(VR)<br>NORM<br>b |
| POLL=VS<br>Data<br>-<br>POLL2_EVENT | RESET<br>RESET | DATA(VS)<br>RSP<br>c | DATA(VS)<br>RSP<br>d |
| POLL!=VS<br>-<br>-<br>POLL3_EVENT | RESET<br>RESET | RESET<br>RESET | DATA(VS-1)<br>RSP |
| POLL(N)=VS<br>NULL<br>NULL<br>POLLN0_EVENT | RESET<br>RESET | POLL(N,VR)<br>NORM | POLL(N,VR)<br>NORM<br>b |
| POLL(N)=VS<br>NULL<br>Data or No Data<br>POLLN1_EVENT | RESET<br>RESET | POLL(VR)<br>NORM | POLL(VR)<br>NORM<br>b |
| POLL(N)=VS<br>Data<br>-<br>POLLN2_EVENT | RESET<br>RESET | POLL(VR)<br>NORM | POLL(VR)<br>RSP |

SECONDARY STATE TABLE (continue)

| | | | |
|---|---|---|---|
| POLL(N)!=VS<br>-<br><br>POLLN3_EVENT | RESET<br>RESET | RESET<br>RESET | DATA(VS-1)<br>RESET |
| Inputs | RESET | NORM | RSP |
| DATA<br>-<br>NULL<br>D0_EVENT | RESET<br>RESET | POLL(N,VR)<br>NORM | POLL(N,VR)<br>RSP |
| DATA<br>-<br>Data<br>D1_EVENT | RESET<br>RESET | POLL(VR+1)<br>NORM<br>e | POLL(VR+1)<br>NORM<br>e |
| DATA<br>-<br>No Data<br>D2_EVENT | RESET<br>RESET | RESET<br>RESET | RESET<br>RESET |
| TEST<br><br><br>TEST_EVENT | TEST<br>RESET | TEST<br>NORM | TEST<br>RSP |
| VERSION<br><br><br>XID_EVENT | VERSION<br>RESET | VERSION<br>NORM | VERSION<br>RSP |
| UP<br>NULL<br>-<br>UP0_EVENT | RESET | NORM | RSP |
| UP<br>DATA<br>-<br>UP0_EVENT | RESET | UP<br>NORM | UP<br>RSP |
| UP(addr)<br>-<br><br>UP1_EVENT | UP<br>RESET | UP<br>NORM | UP<br>RSP |

ACTIONS

```
a -- trfcb->status = reset.
    rrfcb->status = reset.
    tx_done.
    rx_done.
    VS = VR = 0 b -- trfcb->status = good.
    tx_done.
```

SECONDAY STATE TABLE (continue)

```
c -- Set FIC indication.
     If last buffer
         set LIC indication.
     VS = VS+1.

d -- Set MIC indication.
     if last buffer
         set LIC indication.
     VS = VS + 1.

e -- Accept I-Frame.
     VR = VR + 1;
```

6.0 RTC Protocol Frames

The RTC protocol handles the transfer of data over the RF link. This protocol allows the basic sending data to and receive data from the terminals. In addition, functions to allow loopback of data, resetting the terminal protocol and version identification are implemented.

The protocol uses an asynch, 4800 bps, no parity and 1 stop bit encoding scheme that is frequency modulated (FM) over the radio link.

The RTC protocol uses a slotted polling technique instead of a sequence poll. Using this technique, the MUX will find out who has data available to send to the MUX and if a terminal can communicate with the MUX before a data frame is sent to it. Using a slotted poll has several advantages. The first one is a quicker detection of a terminal that have data to send and reductions in the number of idle poll cycles. The second advantage is that the MUX will not try to communicate with a terminal unless the terminal can communicate with the MUX. The last is that terminals may be added to the network dynamically without host intervention.

6.1 RTC Frame

The protocol uses the following frame format:

<stx> <addr> <command> <data> <etx> <crc-16> where <stx>      -- hex value 02H which indicates the start of
                    frame
      <addr>     -- address of the terminal communicating
                    FFH is a broadcast message the high order
                    bit (80H) is always set.
      <command>  -- RTC command field (see section 6.2)
      <data>     -- optional data field with length from 0 to
                    256 bytes. only 128 bytes are true data
                    bytes transparency is maintained by
                    replacing all stx (02H), etx (03H), and
                    dle (10H) bytes with the combination of
                    dle-<cbyte> where the <cbyte> is the
                    original byte with the high-order bit set
                    (80H).

<etx> -- hex value 03H which indicates the end of a frame

<crc-16> -- CRC-16 check value which is calculated from <addr> up to and including the <etx> field all frames with invalid CRC are ignore and the proper action for the terminal is to set up to receive again.

6.2 RTC Commands

RTC command is designated by the lower 4 bits of the <command> field. The high order bit of the command field (80H) is always set. The other three bits are optional set depending on the command.

The following is the value of the different commands:

```
UP          OFH         Section 6.2.1
POLL0       00H         Section 6.2.2
POLL1       01H         Section 6.2.2
RESET       02H         Section 6.2.3
DATA        03H         Section 6.2.4
TEST        04H         Section 6.2.5
VERSION     05H         Section 6.2.6
```

6.2.1 UNNUMBERED POLL (UP) FRAME

A UP is send to all terminals from the MUX using the broadcast address (FFH). The UP command and responds are sent with the RTC command byte being a FFH also. If a terminal has a response waiting, it will respond in one of the timed slots provided for by the UP command. The MUX UP command can dynamically increase the number of slots by the use of a one-byte field (with high order bit set (80H)) in the frame that indicates the number of slots available. The MUX UP command can also indicate which terminals have messages pending to it by including the terminal address the frame after the number of slots field with the high order bit set (80H). The format of the MUX UP frame will be:

<FFH> <UP command (FFH)> <# of slots> <optional addresses>

The length of a slot is 40 ms and the terminal must randomly choose which slot to answer in. The terminal will respond with the basic RTC frame with its terminal address in the address field and the UP command (FFH) in the command field.

6.2.2 POLL0 (00H) and POLL1 (01H) FRAMES

The POLLx frames are used for three purposes:

1) The MUX uses the POLLx frames to actively poll an individual terminal for data.

2) Both the MUX and the terminal uses the POLLx frames to acknowledge receipt of a DATA frame.

3) The terminal will send this if it has nothing to send to a POLLx command from the MUX.

When the MUX detects a terminal RESET command, both the terminal and MUX logical control for that terminal will be set to be sending POLL0 frames. Upon receipt DATA frame from the communicating partner, the device will starting using POLL1.
This flip-flopping will continue for each valid data frame
received by a device.

The NO DATA bit (10H) in the POLLx command field is used by the
MUX to poll a specific device to see if it is out there and
wishes to not receive data at this time. This will occur when
the MUX has tried to send a DATA frame to the terminal and no
valid response was received. The MUX will poll again to see if
the terminal has received the frame.

6.2.3 DATA FRAME

The DATA frame is used to transfer data from the MUX to the
terminal and vice-versa. When sent by the MUX, a DATA frame can
be sent at anytime. The terminal can send a DATA frame only in
response to a POLLx with the NO DATA bit not set from the MUX.

If the receiving device accepts a valid DATA frame (no errors),
then it is required to respond with the next POLLx frame. If a
device received a POLLx frame in response to a DATA frame, the
DATA frame is assumed to have been sent correctly.

The DATA frame has two special bits in the command field to give
it the ability to send messages longer than 128 bytes of data.
The FIRST IN CHAIN bit (FIC - 10H) indicates that this message is
the first block in a chain of blocks. The LAST IN CHAIN bit (LIC
- 20H) indicates that this block is the last block in a chain of
blocks. Setting both FIC and LIC means this is the only block in
the chain (OIC). Both FIC and LIC being cleared indicates that
this block is the middle block of a chain (MIC) and that more is
coming. A chain of blocks must be concatenated together to form
a single block before processing on the data can begin at the
receiving device.

6.2.4 RESET FRAME

The RESET frame is used to get the MUX and terminal into sync.
The RESET command is sent to indicate that one unit is out of
sync with the other device. This frame sequence can be forced by
the HOST.

The MUX will send a RESET command if the host requests it, an
invalid POLLx frame is received, if the terminal is not
recognized by the MUX yet, or the terminal has sent a RESET frame
to it. The MUX will keep sending the RESET frame to the terminal
until a valid RESET frame is received from the terminal in
response.

The terminal will send a RESET frame to the first valid non-
broadcast frame on power up, upon receipt of an invalid POLLx
frame and in response to a RESET frame from the MUX. Once the
terminal enters a state where it needs to send a RESET frame, it
will respond to a UP frame as having data to send and keep
sending a RESET frame to any valid non-broadcast frame that is
sent to it until the terminal receives and responds to valid MUX
RESET frame.

6.2.5 TEST FRAME

The TEST is initiated by the MUX device. This causes the
terminal to respond with the identical TEST frame if has just
receive. The data field of the TEST frame can be form 0 to 128
bytes of true data.

6.2.6 VERSION FRAME

```
The MUX sends this frame to enquire the terminal about the
version of software this terminal is running. The terminal
answer immediately with a VERSION frame with the data indicating
the proper version information up to 128 bytes in length.
```

I claim as my invention:

1. A method of effecting communication between a primary transceiver means and a group of mobile secondary transceiver means having respective distinctive identification means, with communication link means for affording communication therebetween, said method comprising:
   (a) operating said primary transceiver means to transmit a group polling message via said communication link means, specifying a series of response time slots in which the secondary transceiver means may respond,
   (b) operating the secondary transceiver means which receive said group polling message and which have a coded data message to transmit to said primary transceiver means
      (b1) to randomly select one of the series of response time slots and
      (b2) in the respective randomly selected response time slots, to send respective response messages which contain the respective identification means such that the primary transceiver means may identify respective secondary transceiver means of the group which have responded to the group polling message,
   (c) operating the primary transceiver means to time the expiration of the series of response time slots defining a response time interval and after expiration of such response time interval, to initiate communication via said communication link means with a particular one of said secondary transceiver means which has responded to said group polling message for receiving a coded data message therefrom,
   (d) performing steps (a) a multiplicity of times, and operating said primary transceiver means to change the number of response time slots which are specified in a group polling message according to step (a) in accordance with the number of times a collision occurs wherein plural secondary transceiver means send respective response messages according to step (b2) in the same response time slot, and
   (e) operating said primary transceiver means subsequent to the issuance of a group polling message according to step (a) specifying a changed number of response time slots to observe a different response time interval corresponding to the expiration of the changed number of response time slots before initiating further communications according to step (c) via said communication link means.

2. The method of claim 1, further comprising performing step (a) a multiplicity of times, and operating said primary transceiver means to automatically evaluate whether a greater or less number of response time slots should be specified in successive group polling messages transmitted according to step (a), and sending concurrently with a subsequent one of the group polling messages according to claim (a) a time slot number change message for changing the number of said series of response time slots with respect to further operation of said secondary transceiver means according to step (b1).

3. The method of claim 1, further comprising operating said primary transceiver means when the primary transceiver means has a message to send to a particular secondary transceiver means to send a group polling message according to step (a) and contemporaneously therewith to send an identifying message containing the identification means for identifying the particular secondary transceiver means.

4. The method of claim 3, further comprising operating the particular secondary transceiver means upon receipt of the group polling message and identifying message to execute a timing cycle defining the series of response time slots, to randomly select one of the response time slots, and in the randomly selected response time slot sending an acknowledgement message containing its identification means.

5. The method of claim 4, wherein the group polling message including the identifying message occupies a time interval not greater than the duration of a response time slot.

6. The method of claim 5, wherein a response time slot has a duration of not greater than forty milliseconds.

7. The method of claim 6, wherein the secondary transceiver means communicate with the primary transceiver means via a radio frequency link and switch from receiver mode to transmit mode in order to respond to a group polling message in a switchover time of fifteen milliseconds.

8. The method of claim 1, wherein the primary transceiver means is selectively operated to receive a specific response time slot and to transmit one of the group polling messages which concurrently designates a particular secondary transceiver means which is to use the reserved specific response time slot.

9. In a data capture system,
   (a) base station transceiver means,
   (b) a multiplicity of mobile hand-held transceiver units operating at varying distances from the base station transceiver means and operable to switch from receive to transmit mode in not more than fifteen milliseconds and to transmit a minimum duration identifying response message in a brief time interval of not more than fifteen milliseconds.
   (c) said mobile hand-held transceiver means collecting data for transmission as a coded data message to the base station transceiver means in a data transmission time interval which is of duration greatly exceeding said brief time interval,
   (d) said base station transceiver means being operative to communicate with a multiplicity of mobile hand-held transceiver units via a radio frequency communication channel and automatically periodically switching to a multiterminal polling mode and sending a multiterminal polling message via said radio frequency communication channel so as to be received in common by a multiplicity of mobile hand-held transceiver units for the purpose of polling the mobile hand-held transceiver units for coded data messages, wherein said multiterminal polling message also specifies a series of common response time slots in which the mobile hand-held transceiver units may respond, the base station being operative to change the number of common response time slots which are specified in subsequent multiterminal polling messages in accordance with the number of times a collision occurs, wherein a multiplicity of mobile hand-held transceiver units transmit respective identifying responses in the same response time slot, (e) respective mobile hand-held transceiver units when having a coded data message to transmit to said base station transceiver means being normally in receive mode so as to receive multiterminal polling messages from the base station transceiver means, the respective mobile hand-held transceiver units upon receiving a multiterminal polling message each beginning a slot timing cycle extending from the time of receipt of such multiterminal polling message and defining a series of common response time slots essentially common to the respective mobile hand-held transceiver units, each of the respective mobile hand-held transceiver units randomly selecting one of the series of common response time slots and switching to transmit mode and transmitting a respective minimum duration identifying response in the respective selected ones of said series of common response time slots, (f) said base station transceiver means being operative to time the expiration of the series of common response time slots specified in a multiterminal polling message defining a response time interval and after expiration of such response time interval responding to received minimum duration identifying responses following a multiterminal polling message to conduct a sequential polling operation wherein the base station transceiver means transmits a coded individual polling message addressed to a respective one of the mobile hand-held transceiver units, such addressed mobile hand-held transceiver unit upon receipt of such coded individual polling message addressed thereto, automatically switching to transmit mode and transmitting its coded data message via said radio frequency communication channel for a data transmission time interval which is of duration greatly exceeding said brief time interval, whereby data messages are automatically collected from mobile hand-held transceiver means having data messages to send entirely on the basis of polling messages automatically initiated by the base station transceiver means.

* * * * *

UNITED STATES PATENT AND TRADEMARK OFFICE
CERTIFICATE OF CORRECTION

PATENT NO. : 4,940,974

DATED : July 10, 1990

INVENTOR(S) : Marvin L. Sojka

It is certified that error appears in the above-identified patent and that said Letters Patent is hereby corrected as shown below:

Column 7, line 18, "Section 3.2 1," should be
-- Section 3.2.1 --;

Column 7, line 37, after "rtc" delete the "13" and insert an underline -- _ --;

Column 37, Claim 1, line 1, Subparagraph (d), "steps" should be -- step --;

Column 37, Claim 2, line 63, "less" should be
-- lesser --;

Column 37, Claim 2, line 67, "claim" should be
-- step --;

Column 38, Claim 7, line 38, "receiver" should be
-- receive --;

Column 38, Claim 8, line 42, "receive" should be
-- reserve --; and

UNITED STATES PATENT AND TRADEMARK OFFICE
CERTIFICATE OF CORRECTION

PATENT NO. : 4,940,974

DATED : July 10, 1990

INVENTOR(S) : Marvin L. Sojka

It is certified that error appears in the above-identified patent and that said Letters Patent is hereby corrected as shown below:

Column 38, Claim 9, line 55, after "milliseconds" the period "." should be a comma -- , --.

Signed and Sealed this

Tenth Day of December, 1991

Attest:

HARRY F. MANBECK, JR.

Attesting Officer

Commissioner of Patents and Trademarks